United States Patent
Kalogridis et al.

(10) Patent No.: US 8,121,101 B2
(45) Date of Patent: Feb. 21, 2012

(54) MULTICHANNEL MAC IN WIRELESS NETWORKS

(75) Inventors: Georgios Kalogridis, Bristol (GB); Neil Fanning, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 888 days.

(21) Appl. No.: 12/153,106

(22) Filed: May 14, 2008

(65) Prior Publication Data

US 2009/0046681 A1 Feb. 19, 2009

(30) Foreign Application Priority Data

May 14, 2007 (GB) .................................. 0709240.6

(51) Int. Cl.
*H04W 4/00* (2009.01)
(52) U.S. Cl. ........................................ 370/338; 370/349
(58) Field of Classification Search .......... 370/328–339, 370/349, 465, 522
See application file for complete search history.

(56) References Cited

U.S. PATENT DOCUMENTS 7,020,472 B2 * 3/2006 Schmidt ........................ 455/450
2005/0180314 A1 * 8/2005 Webster et al. ............... 370/208

OTHER PUBLICATIONS

Xu et al, Performance Comparison between Channel-Bonding and Multi-Channel CSMA, IEEE, 5 pages, 2007.*

* cited by examiner

*Primary Examiner* — Frank Duong
(74) *Attorney, Agent, or Firm* — Oblon, Spivak, McClelland, Maier & Neustadt, L.L.P.

(57) ABSTRACT

A method of transmitting data over a plurality of channels, said channels forming a bonded channel comprising a bonded channel superframe, the bonded channel superframe comprising a bonded channel beacon period and a bonded channel data period;
broadcasting a control message on a bonded channel superframe, said control message indicating that subsequent transmission will be over distinct channels, each of said channels comprising a distinct superframe comprising a beacon period and a data period, and
transmitting in each of the distinct channels a sequence of superframes, each superframe comprising a distinct beacon period followed by a distinct data period.

11 Claims, 4 Drawing Sheets

MULTICHANNEL MAC IN WIRELESS NETWORKS

BACKGROUND OF THE INVENTION

1. Field of the Invention

The present invention relates to wireless networks. More particularly it relates to multi-channel Media Access Control (MAC) operating on a multiple radio or Wireless Local Area Network (WLAN) device.

2. Description of Related Art

The WiMedia MAC and Physical layer (PHY) specification (ECMA, "Standard ECMA-368: High Rate Ultra Wideband PHY and MAC Standard," 2005, incorporated herein by reference) has originated from the Multiband OFDM Alliance (MBOA) proposal.

The goal of a future WiMedia system will be to provide a usable MAC layer throughput in excess of 1 Gbps. For example, a future WiMedia PHY may achieve higher rates by bonding two channels together, providing 2 spatial streams with Multiple Input-Multiple Output (MIMO) and employing a higher rate channel code.

The WiMedia PHY transmits data in units of six Orthogonal Frequency Division Multiplexing (OFDM) symbols instead of the single OFDM symbol unit of 802.11a. The following equations can be used to calculate the characteristics of the highest rate future WiMedia PHY modes using the parameter values shown below in Table 1.

TABLE 1

Future maximum rate PHY mode parameters $$N_{IBP6S} = N_D \cdot N_{bits\_carrier} \cdot N_{ss} \cdot R$$

$$Rate = \frac{N_{IBP6S}}{N_{interleaved\_sym} \cdot T_{sym}}$$

| Parameter | Value | |
|---|---|---|
| $N_D$ (Number of data sub-carriers) | Single channel | 100 |
| | Bonded channel[1] | 210 |
| $N_{bits\_carrier}$ (The number of bits per subcarrier[2]) | | 2 |
| $N_{ss}$ (Number of spatial streams) | | 2 |
| R (Coding Rate) | | 7/8 |
| $T_{sym}$ (OFDM symbol period) | | 312.5 ns |
| $N_{interleaved\_sym}$ (Number symbols for interleaving) | | 6 |

Notes:
[1]Assuming that the 2 guard carriers at the centre of the individual channels and the 9 guard carriers between the individual channels are gained and that 1 carrier is lost to provide a guard carrier at the centre of the bonded channel.
[2]Assuming DCM modulation (QPSK will also provide 2 bits per sub-carrier)

The characteristics of potential future WiMedia PHY modes are shown in Table 2.

TABLE 2

Future maximum rate PHY mode (single and bonded channels)

| | Rate (Mbps) | $N_{IBP6S}$ (Info bits/6 OFDM symbols) |
|---|---|---|
| Single Channel | 1120 | 2100 |
| Bonded channel | 2352 | 4410 |

The introduction of MIMO to provide two spatial streams will result in an increase in the size of the physical layer convergence protocol (PLCP) preamble overhead. If the approach taken in the greenfield preamble of 802.11n is replicated, it can be assumed that a two spatial stream MIMO preamble for the WiMedia PHY will consist of the same synchronisation sequence but will now have two channel estimation sequences. This will result in the standard preamble increasing from 9.375 μs to 11.25 μs and the burst preamble increasing from 5.625 μs to 7.5 μs.

The PHY assumptions derived above can be used to determine the MAC layer throughputs that can be expected. The Wimedia MAC provides two main access methods. The first is Prioritised Channel Access (PCA), which is almost identical to 802.11's Enhanced Distributed Coordination Function (DCF) Channel Access (EDCA); the only differences being in the parameter values. The second access method is the Dynamic Reservation Protocol (DRP) which allocates timeslots to a particular user. Unacknowledged bursts may be described as a third access method; they employ the Minimum Inter Frame Space (MIFS) and the burst preamble and operate over a point-to-point link. The MIFS is shorter than the Short Inter Frame Space (SIFS) because it does not need to include the radio turnaround time. The burst preamble is shorter than the standard preamble because the synchronisation sequence can be reduced due to the retained knowledge that the receiver gained from the previous frame.

FIG. 1 shows two sets of results for the three access methods described above. Beacon overheads have been ignored for the sake of illustrating a theoretical maximum throughput. The first set of results is for a 1500 byte MAC Service Data Unit (MSDU). This is historically the original maximum Ethernet frame size. The maximum User Datagram Protocol (UDP) frame is typically 1024 bytes and the maximum Transmission Control Protocol (TCP) frame is 64 kbytes. TCP frames are segmented into Ethernet frames and then put into 802.11 frames. The second set of results is for a 4095 byte MSDU, which is the maximum MSDU size supported by the WiMedia MAC. If TCP or UDP protocols are employed then a 4095 byte MSDU can only be achieved by frame aggregation.

FIG. 1 illustrates that even with a 2.35 Gbps PHY a 1 Gbps MAC throughput (approximately 50% of the available PHY rate) can only be achieved with a single point-to-point link, without MAC overheads (control and management frames) and employing a frame size that is larger than what the upper layers may generate. It is therefore doubtful if a reliable service can be provided without control and management frames once the streaming has begun.

Getting such low medium capacity utilization is mainly a consequence of the need to spend time for carrier sensing, signal propagation (i.e. IFS) and channel estimation (e.g. PLCP preamble) in a high data rate PHY medium, regardless whether using bonded channels or not.

An improvement can be gained by increasing the amount of time spent transmitting data by increasing the maximum MSDU size beyond 4095 bytes, or, similarly, introducing/enhancing frame aggregation. This might be a valid technique for some of the application specific applications that will have requirements of 1 Gbps MAC throughputs. Packets of this size may not be as enormous as they first seem, because the probability of errors occurring is a function of the transmission time and not of the packet size directly. A packet of 4095 bytes takes only 15 μs to transmit on a 2.35 Gbps PHY, which is much shorter than the coherence time of the channels that will be encountered.

In: Luca De Nardis, Guerino Giancola, Maria-Gabriella Di Benedetto, "A power-efficient routing metric for UWB wireless mobile networks", Vehicular Technology Conference 2003, VTC 2003-Fall. 2003, Volume: 5, pages 3105-3109, incorporated herein by reference, a method is discussed for setting up connections by optimizing a power-dependent cost function. Results show that the power-saving strategy leads to multi-hop communication paths between terminals within reach of each other (physical visibility) and by this way increases network performance.

Optimal power control, scheduling, and routing in UWB networks is discussed, for example, in Radunovic, B., Le Boudec, J.-Y., "Optimal power control, scheduling, and routing in UWB networks", IEEE Journal on Selected Areas in Communications, September 2004, Volume: 22, Issue: 7, pages 1252-1270, incorporated herein by reference. In this certain approach the objective is to maximize flow rates under given node power constraints (there is a linear dependence between rate and signal-to-noise ratio at the receiver). The suggested optimal routing, scheduling and power control solution is characterized by the following assumptions:

1) When data is being sent over a link, it is optimal to have an exclusion region around the destination, in which all nodes remain silent during transmission, whereas nodes outside of this region can transmit in parallel, regardless of the interference they produce at the destination. Additionally, the source adapts its transmission rate according to the level of interference at the destination due to sources outside of the exclusion region.
2) The optimal size of this exclusion region depends only on the transmission power of the source of the link, and not on the length of the link or on positions of nodes in its vicinity.
3) Each node in a given time slot either sends data at the maximum power, or does not send at all.
4) As for the routing, by restricting to a subset of routes where on each successive hop the distance is decreased toward the destination, it is shown that relaying along a minimum energy and loss route is always better than using longer hops or sending directly, which is not obvious since rate is optimised and not power consumption.
5) Finally the design of the optimal MAC protocol is independent of the choice of the routing protocol.

For narrowband networks, assumptions 2), 4), and 5) do not hold, which shows that the design of an UWB network should be addressed in a different way than for narrowband.

However, this is just one approach to the multi-hop problem. For example, one could argue that in Non Line of Sight (NLOS) cases that relaying along minimum energy and loss routes may be inefficient as compared with lowering the rate and increasing the range. The MAC may therefore be dependent of routing decisions as we can dynamically decide whether to trade-off data-rate for robustness to multi-path (and improvement of performance in NLOS), which is needed in order to make good routing decisions. Also, in Line of Sight (LOS) case with (for instance) random node deployment it is still not clear whether multi-hop routing will always improve performance.

In order to improve the throughput performance of WLAN MAC schemes some researchers have proposed to split the single shared channel into two subchannels: a control subchannel and a data subchannel. The control subchannel is used for access reservation to the data subchannel over which the data packets are transmitted (J. Deng, Y. S. Han, and Z. J. Haas, Analyzing Split Channel Medium Access Control Schemes with ALOHA Reservation, Proc. Second Int'l Conf. AD-HOC Networks and Wireless, October 2003, incorporated herein by reference).

Generally, multi-channel MACs utilize more than one channel (e.g. a combination of data and signalling ones) in order to organize access in a more efficient manner. Multi-channel MACs usually address the optimisation problem of organising access with 2 or more channels within either single or multiple hops.

In the 802.11s Common Channel Framework (CCF) approach by Sung-Won Lee and Rakesh Taori; "Common Channel Framework: A Simple Multi-Channel MAC Framework for 802.11s Mesh Network", IST Summit 2006, incorporated herein by reference, the gain in performance is due to different devices using the different channels at the same, but with a control channel used to assign "contention free" access to the other channels.

Multi-rate multi-channel MACs (Niranjan, S. Pandey, and A. Ganz, "Design and evaluation of multichannel multirate wireless networks," Mobile Networks and Applications, Vol. 11, issue 5, pp. 697-709, 2006, incorporated herein by reference.) refer to the problem of having a given number of channels and trying to figure out how to optimally assign channels to links meeting certain traffic-based criteria (more specifically multiple traffic rates). The typical optimization objective is the reduction of multi-rate interference (i.e. "slow" rates "annoying" "high" rates).

Bonded channels have been considered in the 802.11n draft amendment to the standard by the IEEE task group TGn (IEEE P802.11n™/D1.02, Draft Amendment to STANDARD for Information Technology—Telecommunications and information exchange between systems—Local and metropolitan area networks—Specific requirements—Part 11: Wireless LAN Medium Access Control (MAC) and Physical Layer (PHY) specifications: Enhancements for Higher Throughput, incorporated herein by reference). This document describes a Phased Coexistence Operation (PCO) as an optional coexistence mechanism in which a BSS operates in alternating 20 MHz and 40 MHz phases under the control of a PCO AP. The PCO AP reserves the 20 MHz control channel and the 20 MHz extension channel in turn to start the 40 MHz phase and resets the NAV in the 20 MHz channels in the opposite order to start the 20 MHz phase.

Utilising dual WLAN channels for "double" transmission rates has been commercialised in the Atheros chip (Dynamic Turbo technology). The Atheros chips have been widely used within 802.11g wireless router/gateway products by many manufacturers (including Toshiba, Sony, Netgear, NEC, Fujitsu, Gigabyte, D-Link, etc). With this technology, manufacturers claim to have achieved maximum data rates of 2×54 Mps=108 Mps.

Dynamic Turbo is similar to trunking techniques used in Fast Ethernet networks (which use two or more wires to increase overall bandwidth). Briefly described, Dynamic Turbo is designed to automatically double the realized bandwidth when required by handling two channels as one. Dynamic Turbo is engaged based on network traffic requirements and environmental conditions. Access points switch dynamically to this high-performance mode when an associated wireless station requires greater bandwidth based on the sustained throughput between the link between the access point and the station pair. (Atheros Communications White Paper: Super G: Maximizing Wireless Performance, 2004, incorporated herein by reference).

The use of 2 channels in 802.11 to "double" the data rate comes at the expense of range. This is because the same Effective Isotropic Radiated Power (EIRP) (of 100 mW in Europe) is necessary (governed by regulation) and so we cannot increase power, just spread it across a larger bandwidth. For UWB the rules may be different (based more on power spectral density than EIRP) and this may mean we can gain both data rate and range with the "dual radios" or channel bonding approaches. Obviously at the expense of increased device complexity and cost.

It is an object of the present invention to obviate at least some of the above disadvantages and provide an improved network performance at high data rates.

BRIEF SUMMARY OF THE INVENTION

According to a first aspect of the present invention, there is provided a method of transmitting data over a plurality of channels. The channels form a bonded channel comprising a bonded channel superframe. The bonded channel superframe comprises a bonded channel beacon period and a bonded channel data period. A control message is broadcast on a bonded channel superframe. The control message indicates that subsequent transmission will be over distinct channels, each of said channels comprising a distinct superframe comprising a beacon period and a data period. in each of the distinct channels a sequence of superframes is transmitted, each superframe comprising a distinct beacon period followed by a distinct data period.

In a first configuration of the above aspect, the control message is a management frame used to obtain access to the bonded channel medium.

In another configuration of this aspect, the control message comprises an information element broadcast in the bonded channel beacon period In a further configuration of the first aspect the control message obtains priority over other potential MAC frames.

In a configuration of the above aspect further control messages are broadcast in each of the distinct channels indicating the termination of transmission over distinct channels.

In a further configuration of the above aspect, the bonded channel comprises two channels.

In another configuration of the above aspect each of the distinct channels operates a data protocol independent of the other channels.

In yet a further configuration of the first aspect the control message maps a device to at least one of the distinct channels According to a second aspect of the present invention, there is provided a signal for transmission of data over a plurality of channels. The channels form a bonded channel comprising a bonded channel superframe. The bonded channel superframe comprises a bonded channel beacon period and a bonded channel data period.

The bonded channel superframe is adapted for transmitting a control message, said control message indicating that subsequent transmission will be over distinct channels. Each of the distinct channels is adapted for transmitting a sequence of distinct superframes, each superframe comprising a distinct beacon period and a distinct data period.

In a first configuration of the second aspect the control message is a management frame used to obtain access to the bonded channel medium.

In another configuration of the above aspect the control message comprises an information element broadcast in the beacon frame.

In a further configuration of the above aspect the control message obtains priority over other potential MAC frames.

In a configuration of the above aspect further control messages are broadcast in each of the distinct channels indicating the termination of split-channel transmission.

In another configuration of the second aspect the bonded channel comprises two channels.

In a further configuration of the above aspect each of the distinct channels operates a data protocol independent of the other channels.

In yet another configuration of the second aspect the control message maps a device to at least one of the distinct channels.

According to a third aspect of the present invention, there is provided a transmitter having a single or multiple, particularly dual, physical interface. The transmitter is configured for transmitting a signal over a plurality of channels in accordance with the first aspect of the present invention.

According to a fourth aspect of the present invention, there is provided a receiver having a single or multiple, particularly dual, physical interface. The receiver is configured for receiving a signal over a plurality of channels in accordance with the second aspect of the present invention.

According to a fifth aspect of the present invention, there is provided a device having a multiple, particularly dual, physical interface. The device is configured for transmitting a control message in the bonded channel, and is further adapted to transmit, receive and bridge further signals within each of the distinct channels, in accordance with the second aspect of the present invention.

BRIEF DESCRIPTION OF THE SEVERAL VIEWS OF THE DRAWINGS

These and other aspects of the invention will now be further described, by way of example only, with reference to the accompanying figures.

DETAILED DESCRIPTION OF THE INVENTION

Figure 1A:
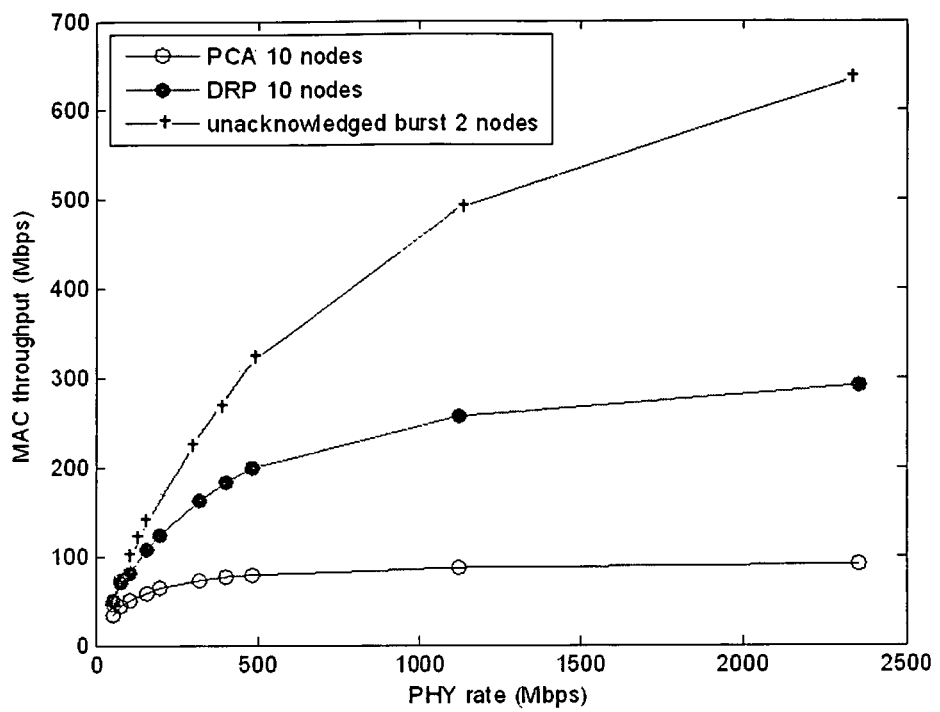
FIG. 1 illustrates throughputs with 1500 byte (top) and 4095 byte (bottom) packets
Figure 1B:
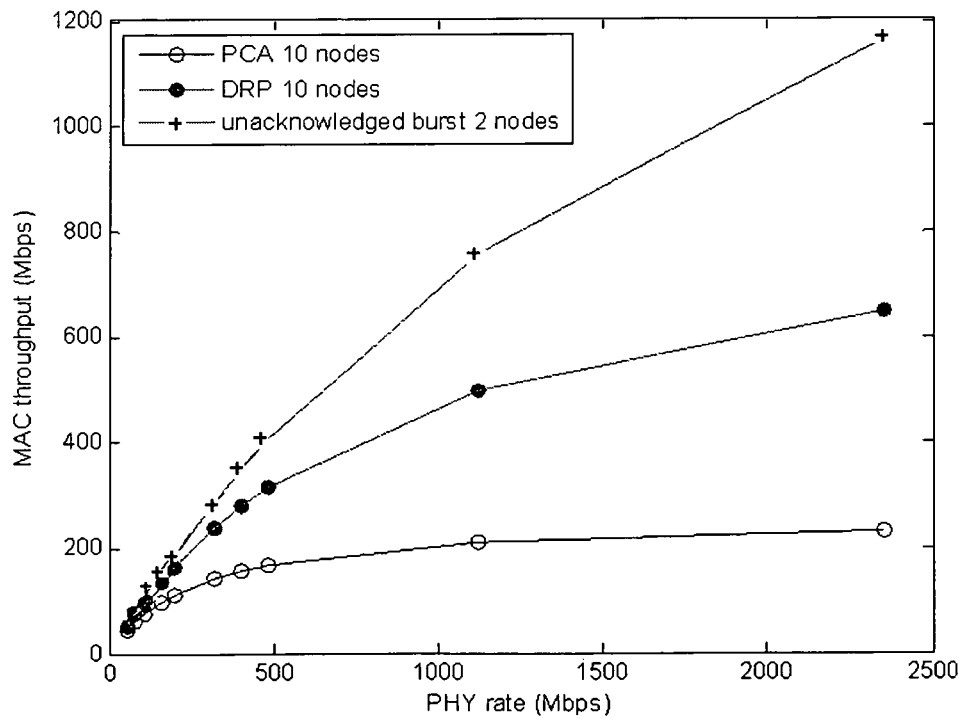

In the present invention, an additional gain in system throughput is obtained by utilising two standard WiMedia channels for parallel transmissions rather than a single transmission over two bonded WiMedia channels. This technique mitigates some of the medium access time that is lost due to MAC and PHY overheads. This improvement is based on the fact that (say) two channels use lower (e.g. half) PHY data rate and the (traffic) assumption that same MSDU sizes are transmitted in both the bonded channel and the split ones.

The multi-channel MAC proposed in the present invention, coined as channel and time (CAT) MAC, dynamically allocates distinct channels to devices that could otherwise operate on a bonded channel, in order to get better MAC performance irrespective of distance, power, data rate adaptations, and without replacing current MAC (data/control channel) protocols. The CAT MAC operates on top of standard protocols, is fully compatible with legacy devices and very scalable in terms of incorporating further link adaptation techniques in multi-hop scenarios.

The CAT MAT uses a control mechanism within the standard channel (MAC superframe) to assign channels and still uses the same contention mechanism within each distinct (split or not) channel. Contrary to 802.11s CCF improvement, CAT MAC improvement is based on the fact that the two channels use lower (e.g. half) PHY data rate as well as the (traffic) assumption that same MSDU sizes will be transmitted in the bonded channel as they will in the split ones. This assumption may, for example, be realised if we have different devices sending certain MSDU frames in different channels as opposed to having them sending these same MSDU frames sequentially.

Current techniques such as frame aggregation and burst transmission are adequate for standard systems. However, in the future, when PHY data rates above 1 Gbps will be feasible (e.g. with channel bonding techniques), frame aggregation and block transmission may not be sufficient. This is where the CAT MAC according to the present invention is expected to further improve the MAC performance.

The invention described herein may be understood as a parallel channel frame aggregation scheme. Parallel channels operating on a portion of the overall bonded channel data rate may mitigate, under certain traffic conditions, the MAC/PHY time overheads and provide a MAC throughput improvement at high data rates. As opposed to frame aggregation (in the time domain), the present invention may additionally improve fairness (multi-user access), reduce delay and buffering and achieve similar results without the need of aggregating numerous MSDUs, which might not be feasible given certain network traffic. Having fewer devices contending for access in a channel may improve the delay for accessing the medium.

As far as the traffic conditions that presumably offer an opportunity for improvement the following comments can be made: Small MSDU frames such as the ones resulting from 40-byte TCP ACKs (layer 3) or (in a block ACK scheme) MAC ACKs (layer 2) enhance the importance of this IAR, since the smaller the packet and the higher the PHY data rate, the worse the efficiency. Bigger MSDU sizes as well as block (or no) ACK schemes, renders the discussed improvements less significant. Hence, a sequence consisting of large (fixed) MSDUs, is probably the most challenging case for demonstrating improvement.

It should be appreciated that frame aggregation may be operated in each one of the parallel channels, limited by the maximum MPDU size, which is expected to be larger in a bonded channel. The maximum size of MPDU (or—similarly—the maximum number of aggregated MSDU frames) is determined by the PHY's capability to transmit large frames (at high data rates) robustly. This capability is dependent on the maximum duration a distinct transmission may be robustly received given the transmitted (with the preamble) channel estimation parameters. This duration may be calculated assuming a certain environment and certain noise and interference models. For example, for 802.11 this is in the range of 1 ms. The maximum allowed MPDU size may be proportional to PHY data rate. The faster the PHY, the longer the MPDU may be allowed to be while maintaining robust transmissions. Hence it is reasonable to assume that the maximum MPDU size for parallel (split) channels should be smaller than the one for the bonded channel, accordingly.

Figure 2:
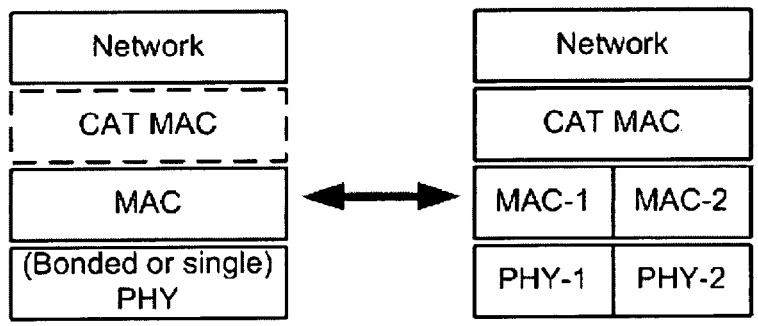
FIG. 2 illustrates the CAT MAC protocol stack.

The CAT MAC is superimposed on standard WLAN/WiMedia MAC protocols as shown in FIG. 2. At least one multiple-PHY device is a prerequisite for CAT MAC, which is, however, fully compatible with legacy devices (without CAT functionality). Legacy devices may operate in one CAT channel (or a bonded channel) with standard MAC protocols being ignorant of any CAT MAC operations. Thus CAT MAC is backwards compatible with a bonded WLAN or a bonded WiMedia channel.

Figure 3:
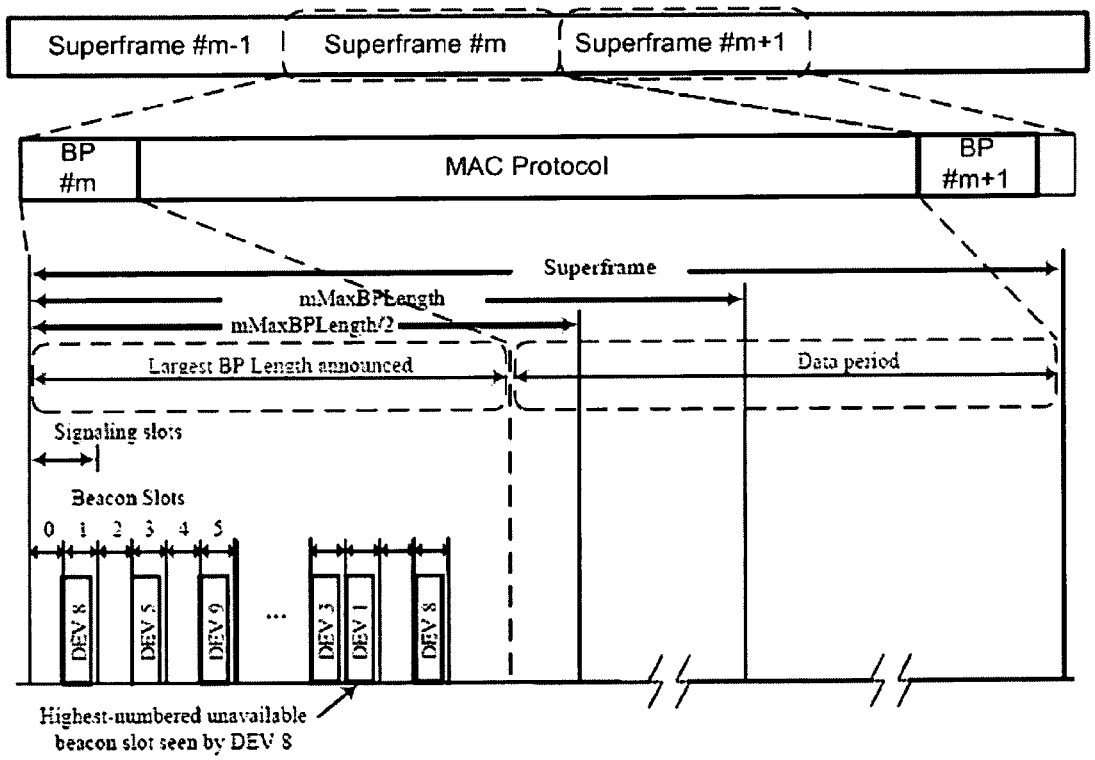
FIG. 3 depicts a WiMedia MAC superframe.

Initially CAT MAC will operate as a standard bonded channel operating a certain MAC protocol (i.e. an ECMA-368 PCA or DRP or even an 802.11 one such as the Hybrid Coordination Function (HCF)). FIG. 3 illustrates an example of a standard WiMedia superframe. Each superframe m−1, m, m+1 starts with a Beacon Period (BP).

With the WiMedia standard, each device in the channel (DEV 1-9) has to transmit a beacon. The beacon period consists of all these beacons. beacon period has a maximum length of mMaxbeacon periodLength beacon slots. Beacon slots in the beacon period are numbered in sequence, starting at zero. The first beacon slots of a beacon period are referred to as signalling slots and are used to extend the beacon period length of neighbours. A device shall announce its beacon period length, measured in beacon slots, in its beacon. The announced beacon period length shall include the device's own beacon slot and all unavailable beacon slots in the beacon period of the prior superframe. The largest beacon period length announced shall not exceed mMaxBPLength. The beacon period length reported by a device varies, as new devices become members of its extended beacon group, and as the device or other devices in its extended beacon group choose a new beacon slot for beacon collision resolution or beacon period contraction.

Figure 4:
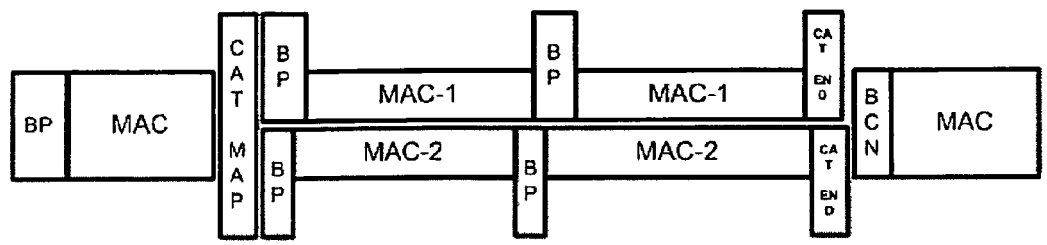
FIG. 4 is a diagram of a CAT MAC superframe in accordance with the present invention.

The CAT MAC period may be commenced at a certain time during the MAC superframe with a message that will be broadcast and all devices can receive and adhere to. For example this may be handled in the following ways:

Explicitly: The CAT MAC period starts following a CAT-MAP control message, broadcasted by the elected CAT controller (typically that is a device with multiple PHYs). The CAT-MAP is defined as a special management frame and gets access to the (bonded channel) medium after a PIFS period in order to get priority over other potential MAC frames (FIG. 4).

Implicitly: The CAT MAC period starts following a (bonded-channel) beacon period. The WiMedia Beacon contains Information Elements (IE) that convey certain control and management information. Any device may include IEs in its beacon frame. WiMedia defines Application-specific IEs (ASIEs) that can be used by applications following a request. The scope of the ASIE is dependent on the application. The application in this case may be the CAT MAC protocol stack (of a controlling CAT device) requesting a certain CAT configuration.

The request for a certain CAT network (either with CAT-MAP or with a CAT-ASIE message) may be broadcasted by an active node that has a dual PHY capability (and is CAT enabled). The CAT-MAP or CAT-ASIE contains information about the PHY channels that devices need to tune in and access.

Each one of the channels will be a WLAN or WiMedia compatible one. Thus, each channel will operate a distinct MAC protocol followed by distinct WiMedia beacon period transmission (FIG. 4).

The beacon period transmissions within the distinct channels may all be operated in a WLAN/WiMedia distributed manner (each device transmitting in a certain Beacon slot). (Note: beacon periods have deliberately been drawn with irregular sizes to show that these may be constructed by varying numbers of devices within the respective distinct channels).

CAT transmission is terminated when a dual PHY device sends a CAT-END message in the channels (following a PIFS). The same (or another) dual PHY device will also transmit a CAT-END message in each one of the other channels. All devices can now participate in a bonded channel PHY the details of which may be included in both the CAT-END messages and/or in the subsequent bonded channel beacon period.

Figure 5:
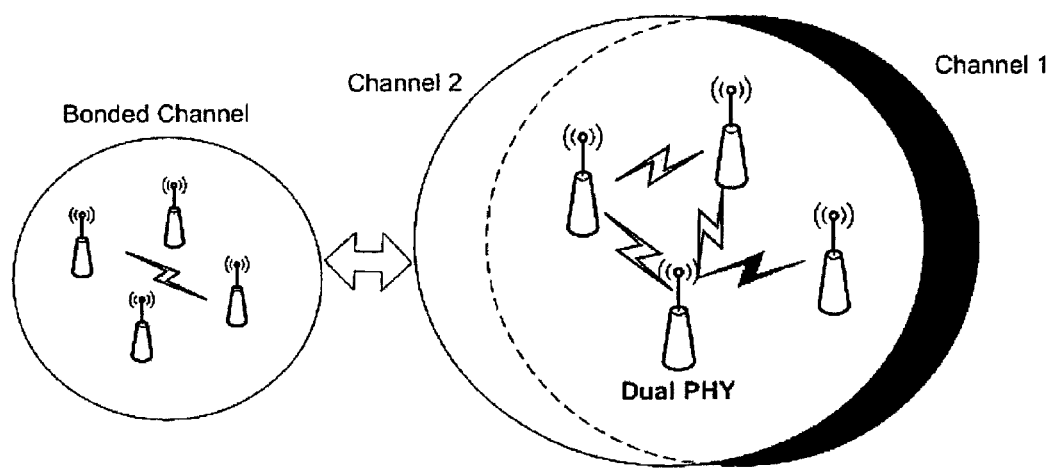
FIG. 5 depicts a CAT network architecture with one dual PHY node.
Figure 6:
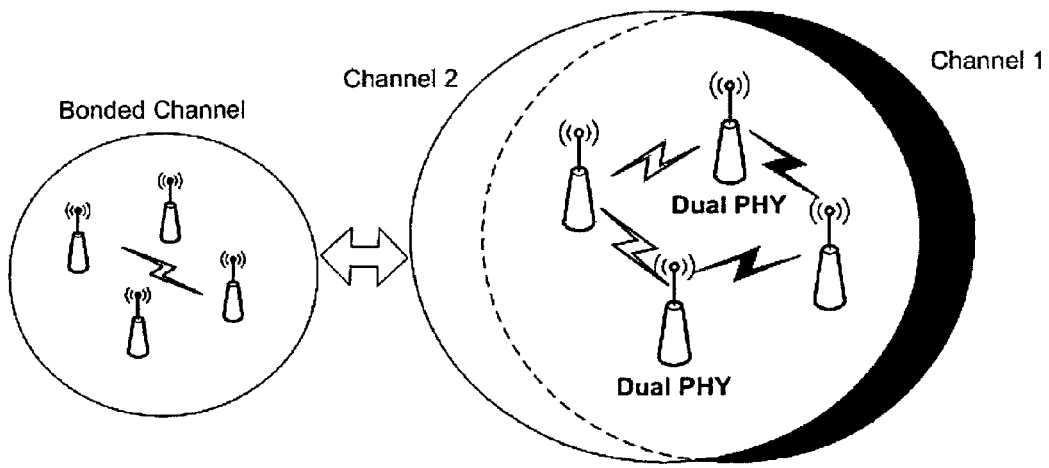
FIG. 6 shows a CAT network architecture with two dual PHY nodes.
Figure 7:
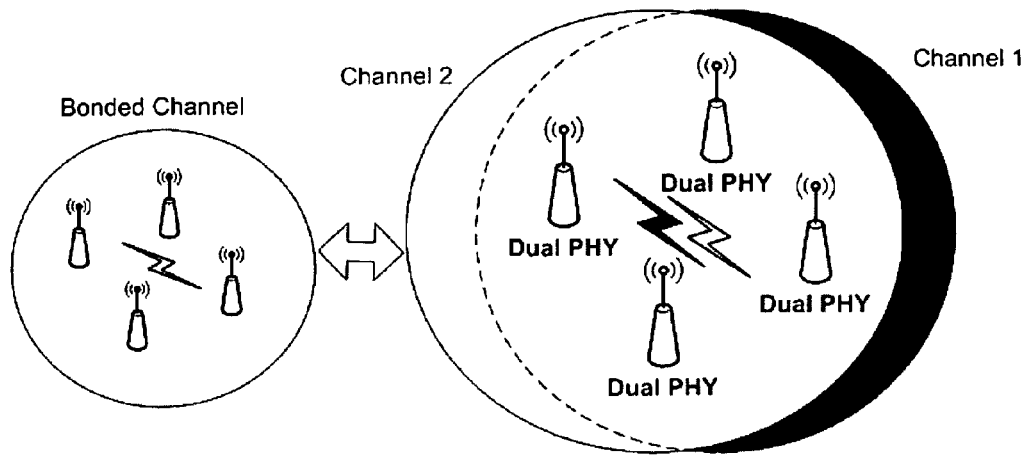
FIG. 7 illustrates a CAT network architecture entirely with dual PHY nodes.

Examples of network architectures are shown in FIGS. 5 to 7.

In FIG. 5 there is only one device with dual PHY. This device is the only one that can initiate a CAT period. In a CAT network the dual PHY node shall send a distinct beacon to both channels' beacon periods.

In FIG. 6 there are two devices with dual PHY. The CAT period can be initiated by any one.

In the first two examples as illustrated in FIG. 5 and FIG. 6, devices are grouped in two (or more) logical single-hop channels. Inter-channel communications may be possible if either the bonded channel is preferred over CAT transmissions, or traffic is bridged over a dual PHY device (multi-hop).

In FIG. 7 all devices have dual PHY capability. The CAT period may be initiated by anyone. In this third example, any device will be able to communicate with any other over two possible channels (and two MACs).

It should be noted that the distinct channels do not have to be synchronised and each device should be able to access (concurrently) each channel according to its distinct MAC protocol.

Figure 8:
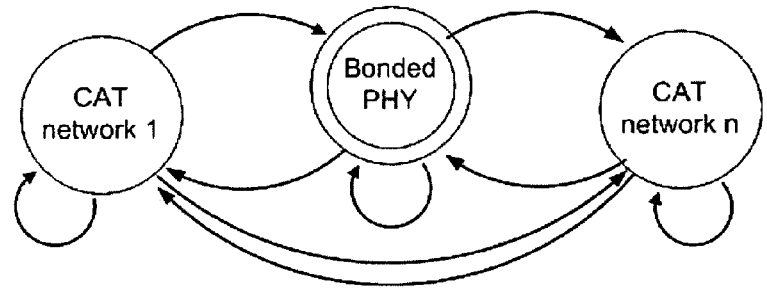
FIG. 8 is a flow chart of CAT MAC network configuration operations.
Figure 8:
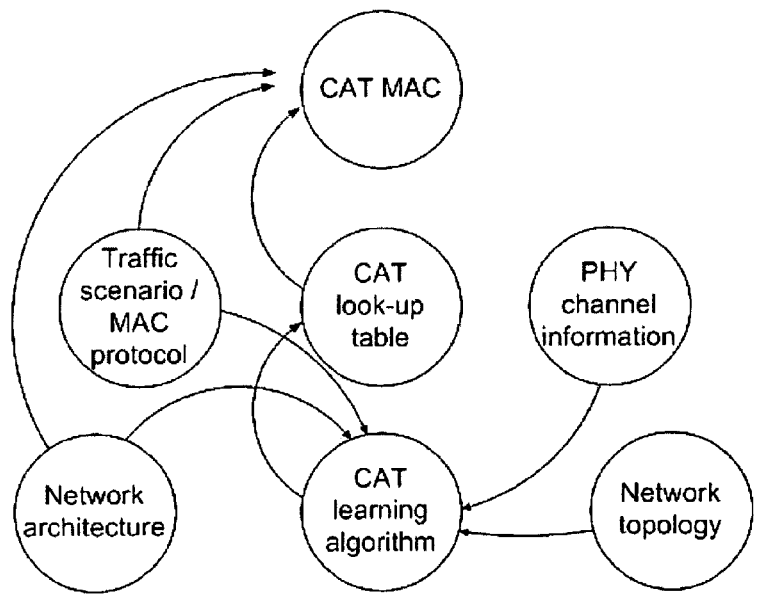

The main operation of the present invention described therein is to choose whether to initiate CAT allocations, which devices to include in which channel and (if appropriate) whether to terminate CAT transmissions and switch to bonded channel ones. Such CAT protocol processes are illustrated in FIG. 8.

Various CAT network configurations are illustrated as states. In each one of these states the CAT MAC process determines whether we stay to the same state or move to another one. In the second part of FIG. 8 we indicate input data that influence the CAT MAC dynamic network configuration operation.

The following remarks address the performance of the channel-and-time protocol according to the present invention:

The CAT system improves the bonded channel's MAC throughput for certain traffic scenarios.

For traffic scenarios discussed herein, a certain MPDU frame is expected to have shorter waiting (delay) time for accessing the medium.

By dividing the size of the network and allowing two devices (in different CAT channels) to transmit in parallel, improved fairness can be expected, considering that access to parallel channels is mainly scheduled for applications that will last for a period of time that is long as compared with the duration of a MAC superframe, e.g. HDD backup, HDV, etc.

The channel-and-time protocol may be further optimised as follows

Regarding the traffic scenario and MAC protocol, Certain MAC protocol/functions and a certain traffic scenario (e.g. MSDU sizes, network size, frame aggregation, block transmission, contention windows, control and management frames, etc) will directly dictate the balance between CAT and bonded PHY performance.

Concerning the Network architecture, certain CAT allocations may result in traffic being bridged over a dual PHY node, doubling the system's load. This results in reduced MAC throughput and end-to-end delay. The amount these performance figures are decreased depends on the traffic scenario and the network architecture (i.e. number of dual PHY nodes). Considering this traffic overhead, there is a certain point where certain performance of the CAT network and the bonded PHY one break even. For CAT performance degradation beyond that threshold, the bonded PHY should be preferred. This threshold will be defined further on in this IAR.

Regarding the network topology and cross layer optimisation, the comparison between the bonded channel and CAT depends on the PHY mode (data rate). In a single hop bonded channel network an increased BER may result in downgrading to a lower PHY data rate. However in a multi-hop scenario, a higher PHY data rate may be acceptable for CAT, rendering it better (e.g. due to shorter distances). In the same fashion CAT system may increase range. Also, an increased BER may suggest changing the traffic scenario (e.g. no block transmissions or no frame aggregation), which will subsequently change the balance between CAT and bonded PHY, as discussed. In overall, this is a routing and link adaptation cross-layer (1-2-3) optimisation problem that may take into account a variety of parameters such as distance, power, performance, etc.

The CAT MAC will decide which one of the bonded channel MAC and the CAT network MAC is supposed to perform better (MAC throughput; Delay and buffering; Fairness) based on all the criteria that influence these CAT performance figures (traffic scenario and MAC protocol; Network architecture; Network topology and cross layer optimisation).

CAT MAC throughput may be evaluated by using the Theoretical Maximum Throughput (TMT) technique (introduced in J. Jun, P. Peddabachagari, and M. Sichitiu, "Theoretical maximum throughput of IEEE 802.11 and its applications," Second IEEE International Symposium on Network Computing and Applications, pp. 249-256, 2003, incorporated herein by reference.) for evaluating the fundamental 802.11 CSMA/CA protocol and further discussed in Y. Zang, G. R. Hiertz, J. Habetha, B. Otal, H. Sirin, and H.-J. Reumerman, "Towards High Speed Wireless Personal Area Network-Efficiency Analysis of MBOA MAC," in International Workshop on Wireless Ad-hoc Networks. London, UK, 2005 incorporated herein by reference, for the ECMA-368 MAC).

To demonstrate how CAT MAC may operate in regards to throughput optimisation irrespective of multi-hop cross layer 1-2-3 considerations that have already been widely studied in literature, the following is assumed for the purpose of a case study: All nodes are relatively closely distanced. All devices operate on the same PHY mode irrespective of the assumed single/multi-hop network architecture and topology. The assumed PHY mode will operate with zero BER and packet loss. CAT and bonded PHY will always be compared on equivalent PHY modes.

A simple CAT look-up table may have the following format:

TABLE 3

Basic CAT look-up table format

| | Network Architecture A Traffic Scenario A | Network Architecture A Traffic Scenario B | Network Architecture B Traffic Scenario A | ... |
|---|---|---|---|---|
| CAT vs Bonded PHY Mode 1 | | | | |
| Performance Metric A - Improvement | | | | |
| Performance Metric B - Improvement | | | | |
| ... | | | | |

TABLE 3-continued

Basic CAT look-up table format

|  | Network Architecture A Traffic Scenario A | Network Architecture A Traffic Scenario B | Network Architecture B Traffic Scenario A | ... |
|---|---|---|---|---|
| CAT vs Bonded PHY Mode 2 | | | | |
| Performance Metric A - Improvement | | | | |
| Performance Metric B - Improvement | | | | |
| ... | | | | |

The CAT MAC will perform the following operations:

Calculate the current network performance by consulting the CAT look-up table for the closest match {traffic scenario, network architecture}, which may be adjusted to the current {traffic scenario, network architecture} with a certain formula.

Apply the same algorithm to calculate the network performance for possible {traffic scenario, network architecture} pairs, by keeping the current traffic scenario and varying the network architecture.

Choose the network architecture that produces the best estimated performance and instantiate the CAT MAC control mechanism for switching to the new CAT network.

The simplest possible look-up table may only consider:

MAC protocols without control/management overheads and traffic scenarios with fixed MSDU sizes and frame aggregation.

MAC throughput as the sole performance metric.

Modifying the TMT methodology described e.g. in Y. Zang, G. R. Hiertz, J. Habetha, B. Otal, H. Sirin, and H.-J. Reumerman (supra) for application to bonded channels and CAT MAC, the following look-up table may be constructed (Table 4).

Given Table 4 the following CAT MAC formula may determine the performance of a given {traffic scenario, network architecture}:

$$I\{PHY, Traf, Net\} = I\{PHY, Traf, 1hop\} - \overline{Traf\{Multihop\}} \quad (1)$$

$$I\{PHY, Traf, 1hop\} = \left(\frac{\overline{M\{Traf\}} - CTM_L}{CTM_R - CTM_L}\right) \cdot I\{PHY, M_R\} + \left(\frac{CTM_R - \overline{M\{Traf\}}}{CTM_R - CTM_L}\right) \cdot I\{PHY, M_L\} \quad (2)$$

Where:

$\overline{Traf\{Multihop\}}$ is the amount of traffic that needs to be bridged from one CAT channel to another CAT channel, for the given (or wanted) {traffic scenario, network architecture}.

$I\{PHY,Traf,1hop\}$ is the performance of the same traffic scenario for a single-hop network architecture, which may be given from the CAT look-up table (Table 4).

$\overline{M\{Traf\}}$ is the mean fixed-size MPDU that best approximates the current (or expected) traffic scenario.

$CTM_L$ and $CTM_R$ are the left and right Closest Table MPDU sizes ($M_L$ and $M_R$, respectively) in Table 4.

$I\{PHY,M\}$ is the look-up table value (throughput improvement) for the given M MPDU size (block transmitted or with Immediate ACK, according to the traffic scenario).

Formula (2) is a linear interpolation of the data rate values. This methodology is of limited importance and should be regarded as a simple implementation example. An alternative way of expressing improvement (as discussed before) is as a function of the fixed overheads (independent of data rate) and the variable overheads and transmission rate (dependent on the selected channel data rate). For certain traffic scenarios, the improved results can be obtained from a developed performance model.

TABLE 4

Example of a primitive CAT look-up table for a single-hop network architecture

| CAT × 2 Throughput $T_C$ | Fixed MPDU size (Traffic scenario) | | | | | |
|---|---|---|---|---|---|---|
| Bonded PHY Throughput $T_B$ | 1500 bytes | | 4095 bytes Improvement: $T_C - T_B$ (Mbps) \| $(T_C - T_B)/T_B$ (%) | | 10000 bytes | |
| 320 × 2-672 | 95.68 | 52% | 100.46 | 30% | 56.61 | 12% |
| 400 × 2-840 | 111.28 | 57% | 126.29 | 33% | 84.22 | 15% |
| 480 × 2-1008 | 128.93 | 64% | 157.16 | 38% | 120.19 | 19% |
| 1120 × 2-2352 | 176.11 | 82% | 315.00 | 63% | 365.19 | 39% |

| CAT × 2 Throughput $T_C$ Bonded PHY | 5 × Block Transmission Fixed MPDU size (Traffic scenario) | | | | | |
|---|---|---|---|---|---|---|
| Throughput $T_B$ | 1500 bytes | | 4095 bytes $T_C - T_B$ (Mbps) \| $(T_C - T_B)/T_B$ (%) | | 10000 bytes | |
| 320 × 2-672 | 92.72 | 29% | 65.08 | 14% | 15.77 | 3% |
| 400 × 2-840 | 118.37 | 33% | 83.08 | 15% | 29.54 | 4% |
| 480 × 2-1008 | 156.87 | 42% | 119.06 | 19% | 56.49 | 7% |
| 1120 × 2-2352 | 294.25 | 65% | 374.69 | 41% | 286.20 | 20% |

For single-hop architectures, CAT will always perform better than the equivalent bonded PHY network (in the simple situation there the total amount of bridged traffic load is zero).

For a multi-hop architecture, the previous equations suggest that a certain CAT network architecture is preferable up to a threshold where the improvement of the associated single-hop CAT network over the bonded channel is greater than the inter-channel traffic that needs to be bridged over a dual PHY node.

To calculate the needed threshold the following mechanism may be used (as an example): The performance of a single hop network may be approximated by calculating the mean MPDU size of the considering traffic scenario and determining whether an Immediate ACK or a Block transmission MAC protocol is operated. The CAT improvement for the mean MPDU size is then approximated by considering the closest MPDU sizes in the look-up table and weighting the improvements accordingly.

Calculating the I{PHY,Traf,Net} for a range of network configurations, the CAT MAC is in position to determine which network (i.e. allocations of nodes to CAT channels) may be most suitable.

CAT allocations offer improved MAC performance as compared to equivalent bonded PHY channel MACs, for particular traffic scenarios and potential network configurations that the existence of dual PHY nodes may handle.

The mechanisms described in this invention are fully compatible with legacy WLAN/WiMedia standards. This is attributed to the added flexibility to dynamically choose between various network and channel configurations.

The CAT MAC is very scalable in terms of incorporating other known optimisation technologies such as frame aggregation, burst transmission, link adaptation and multi-hop optimization and range extension.

The present invention may optionally be used in conjunction with such technologies in order to further improve MAC performance (e.g. link utilization).

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of operating a device for transmitting data over a plurality of channels, said channels forming a bonded channel including a bonded channel superframe, the bonded channel superframe including a bonded channel beacon period and a bonded channel data period, the method comprising:
broadcasting, by the device, a control message on the bonded channel superframe, said control message indicating that subsequent transmission will be over distinct channels, each of said distinct channels including a distinct superframe having a distinct beacon period and a distinct data period, and
transmitting, by the device, in each of the distinct channels, a sequence of superframes, each superframe including the distinct beacon period followed by the distinct data period.

2. The method according to claim 1, wherein the control message is a management frame used to obtain access to the bonded channel superframe.

3. The method according to claim 1, wherein the control message including an information element broadcast in the bonded channel beacon period.

4. The method according to claim 1, wherein the control message obtains priority over other potential MAC frames.

5. The method according to claim 1, wherein further control messages are broadcast in each of the distinct channels indicating the termination of transmission over distinct channels.

6. The method according to claim 1, wherein the bonded channel including two channels.

7. The method according to claim 1, wherein each of the distinct channels operates a data protocol independent of the other channels.

8. The method according to any one of the preceding claims, wherein the control message maps a device to at least one of the distinct channels.

9. A transmitter having a single or multiple, dual, physical interface, said transmitter being configured for transmitting a signal over a plurality of channels, said channels forming a bonded channel including a bonded channel superframe, the bonded channel superframe including a bonded channel beacon period and a bonded channel data period, the transmitter comprising:
a broadcasting means configured to broadcast a control message on a bonded channel superframe, said control message indicating that subsequent transmission will be over distinct channels, each of said distinct channels including a distinct superframe having a distinct beacon period and a distinct data period, and
wherein said transmitter is further configured to transmit, in each of the distinct channels, a sequence of superframes, each superframe including the distinct beacon period followed by the distinct data period.

10. A receiver having a single or multiple, dual, physical interface, said receiver being configured for receiving a signal over a plurality of channels, said channels forming a bonded channel including a bonded channel superframe, the bonded channel superframe including a bonded channel beacon period and a bonded channel data period, the receiver comprising:
means for receiving a control message on a bonded channel superframe, said control message indicating that subsequent transmission will be over distinct channels, each of said distinct channels including a distinct superframe having a distinct beacon period and a distinct data period, and
wherein said receiver is further configured to receive, in each of the distinct channels, a sequence of superframes, each superframe including the distinct beacon period followed by the distinct data period.

11. A device having a multiple, dual, physical interface, said device being configured for transmitting a control message in a bonded channel, and further adapted to transmit, receive and bridge further signals within each of distinct channels, said channels forming the bonded channel including a bonded channel superframe, the bonded channel superframe including a bonded channel beacon period and a bonded channel data period, the device comprising:
means for receiving the control message on a bonded channel superframe, said control message indicating that subsequent transmission will be over distinct channels, each of said distinct channels including a distinct superframe having a distinct beacon period and a distinct data period, and
wherein said device is further configured to receive, in each of the distinct channels, a sequence of superframes, each superframe including the distinct beacon period followed by the distinct data period.

* * * * *